Feb. 8, 1966  D. M. MacMILLAN  3,233,284
LOADER DEVICE FOR A REPLACEABLE TIRE RETREADING MATRIX
Filed March 13, 1961  5 Sheets-Sheet 3

INVENTOR.
DONALD MAC MILLAN
BY
Mason, Porter, Diller & Stewart
ATTORNEYS

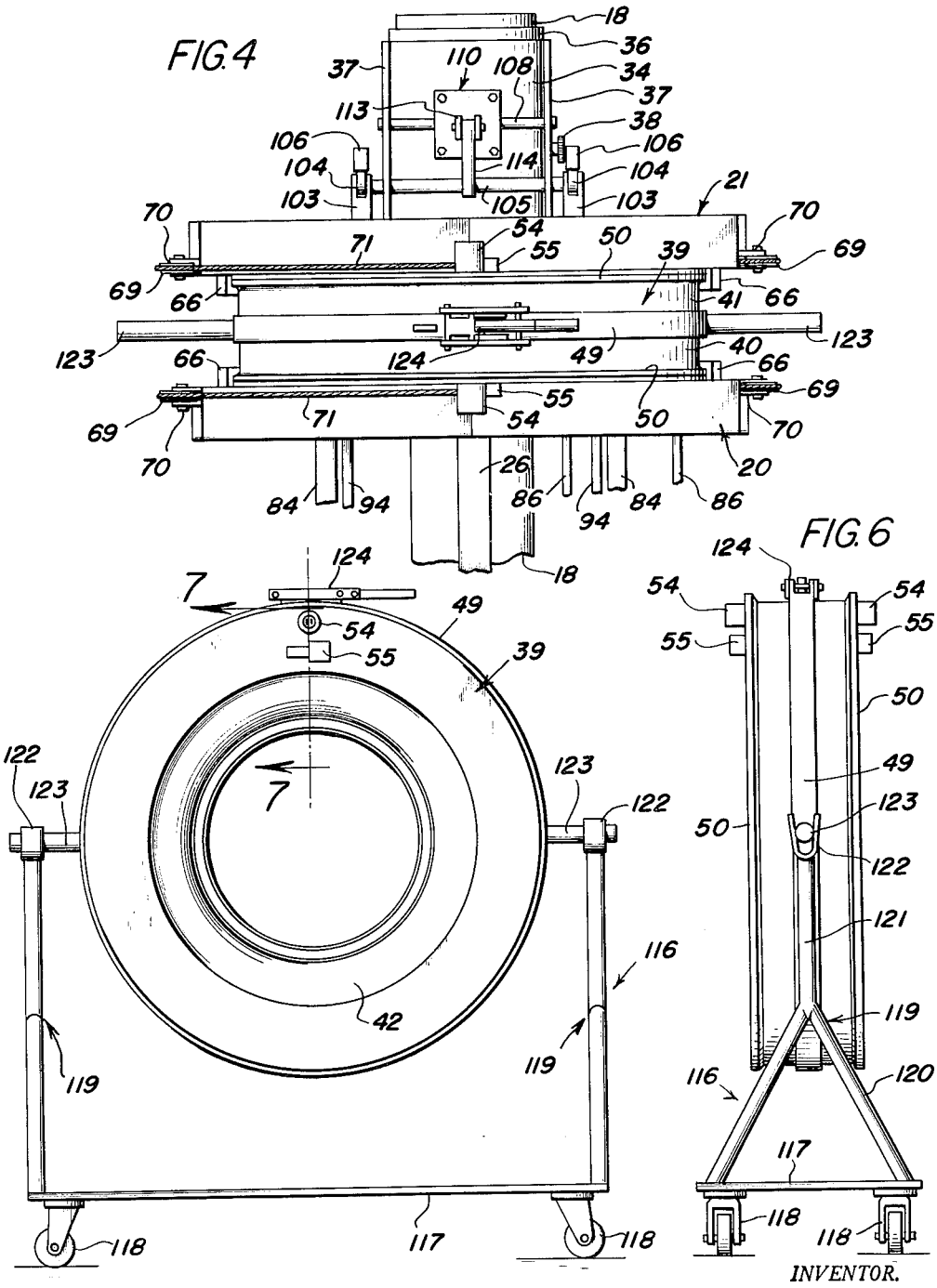

Feb. 8, 1966  D. M. MacMILLAN  3,233,284
LOADER DEVICE FOR A REPLACEABLE TIRE RETREADING MATRIX
Filed March 13, 1961  5 Sheets-Sheet 5

INVENTOR.
DONALD MAC MILLAN
BY
Mason, Porter, Diller & Stewart
ATTORNEYS

United States Patent Office 3,233,284
Patented Feb. 8, 1966

3,233,284
LOADER DEVICE FOR A REPLACEABLE TIRE
RETREADING MATRIX
Donald M. MacMillan, Macon, Ga., assignor to Kenneth
T. MacMillan, executor of said Donald M. MacMillan,
deceased
Filed Mar. 13, 1961, Ser. No. 95,343
1 Claim. (Cl. 18—2)

This invention relates in general to new and useful improvements in the art of retreading vehicle tires, and more specifically relates to a novel tire retreading machine.

At the present time, tires are retreaded or recapped in a unitary retreading machine. These machines receive the tires in horizontal positions, and because of the size of the tire retreaded thereby, as well as the bulk of the machine per se, the retreading machine occupies a relatively large amount of space. Furthermore, a large portion of the retreading machine is in the form of a clamp assembly for holding the matrix thereof in a tire clamping position. Since a relatively long period of time is required for the curing of the retread material on the tire casing, it will be apparent that a relatively expensive machine which occupies a large amount of space is required for an operation which during the major part of the operation requires only the matrix.

In view of the foregoing, it is the primary object of the invention to provide a tire retreading machine which includes replaceable matrices and a loader for facilitating the opening and closing of each matrix, as well as the holding of a matrix half during the positioning of a tire within the matrix.

Another object of the invention is to provide a tire retreading machine which includes a plurality of matrices which are replaceable and interchangeable, the matrices, once they are closed with a tire sealed therein, being capable of curing the camelback which is being applied to the casing, the individual matrix having its own self-contained heating system, the tire retreading machine additionally including a loader for the purpose of opening and closing the matrix to facilitate the positioning and removal of a tire.

Another object of the invention is to provide a novel replaceable matrix for the retreading of tires, the matrix including a pair of matrix halves which are provided with opposed peripheral ribs having tapered remote surfaces, a channel cross-section locking band receiving the peripheral ribs and engaging the tapered surfaces to urge the matrix halves together, whereby once the matrix halves have been moved together clamping a tire therewithin, the clamping band may be applied and will retain the matrix halves in the proper matrix-forming position, the individual matrix half having its independent heating system whereby once a tire has been placed within the matrix, the matrix may be stored to occupy a minimum space during a curing operation.

A further object of the invention is to provide a retreading machine for tires, the retreading machine including a plurality of replaceable matrices, a loader for opening and closing the matrices, and a support stand for supporting and storing an individual matrix, the individual matrix being provided with trunnions, and the support stand having sockets receiving the trunnions, whereby the matrix may be stored in a vertical position and may be readily swung to a horizontal position for reception within the loader.

Still another object of the invention is to provide a novel loader for use in conjunction with a tire retreading matrix of the type which includes matrix halves, the loader including a stationary matrix half support and a movable matrix half support which is mounted for movement away from and towards the stationary matrix half support, and matrix half clamp means carried by each of the matrix half supports for temporarily securing the matrix halves to the loader to facilitate the separation and closing of the matrix and the positioning and removal of a tire relative thereto.

Still another object of the invention is to provide a novel retreading machine for tires, the retreading machine including a stationary support and a movable support, the movable support being mounted for movement towards and away from the stationary support, and clamp means carried by each of the supports for clampingly engaging matrix halves to facilitate the separation of the matrix halves and the loading and unloading of a tire relative thereto, and each of the matrix supports having associated therewith a movable bead aligner which is adjustable to position a tire relative to the matrix halves prior to the engagement of the tire by the matrix halves.

A still further object of the invention is to provide a novel matrix for retreading tires, the matrix including halves which are normally clamped together by a clamp band, each of the halves being provided with a separate electric system, including an annular heating element inset in a groove in the matrix half, and material cast into the recess outwardly of the heating element to lock the heating element within the recess.

With the above, and other objects in view that will hereinafter appear, the nature of the invention will be more clearly understood by reference to the following detailed description, the appended claim, and the several views illustrated in the accompaying drawings.

In the drawings:

FIGURE 4 is a fragmentary elevational view, showing the matrix clamped in between the matrix half supports.

FIGURE 5 is an elevational view showing the matrix supported by a cart for storage during the tire tread curing stage.

FIGURE 6 is an end view of the matrix and cart of FIGURE 5.

FIGURE 11 is an enlarged fragmentary sectional view, taken through one of the matrix halves, and shows the manner in which the heating element thereof is retained therein.

Figure 1:
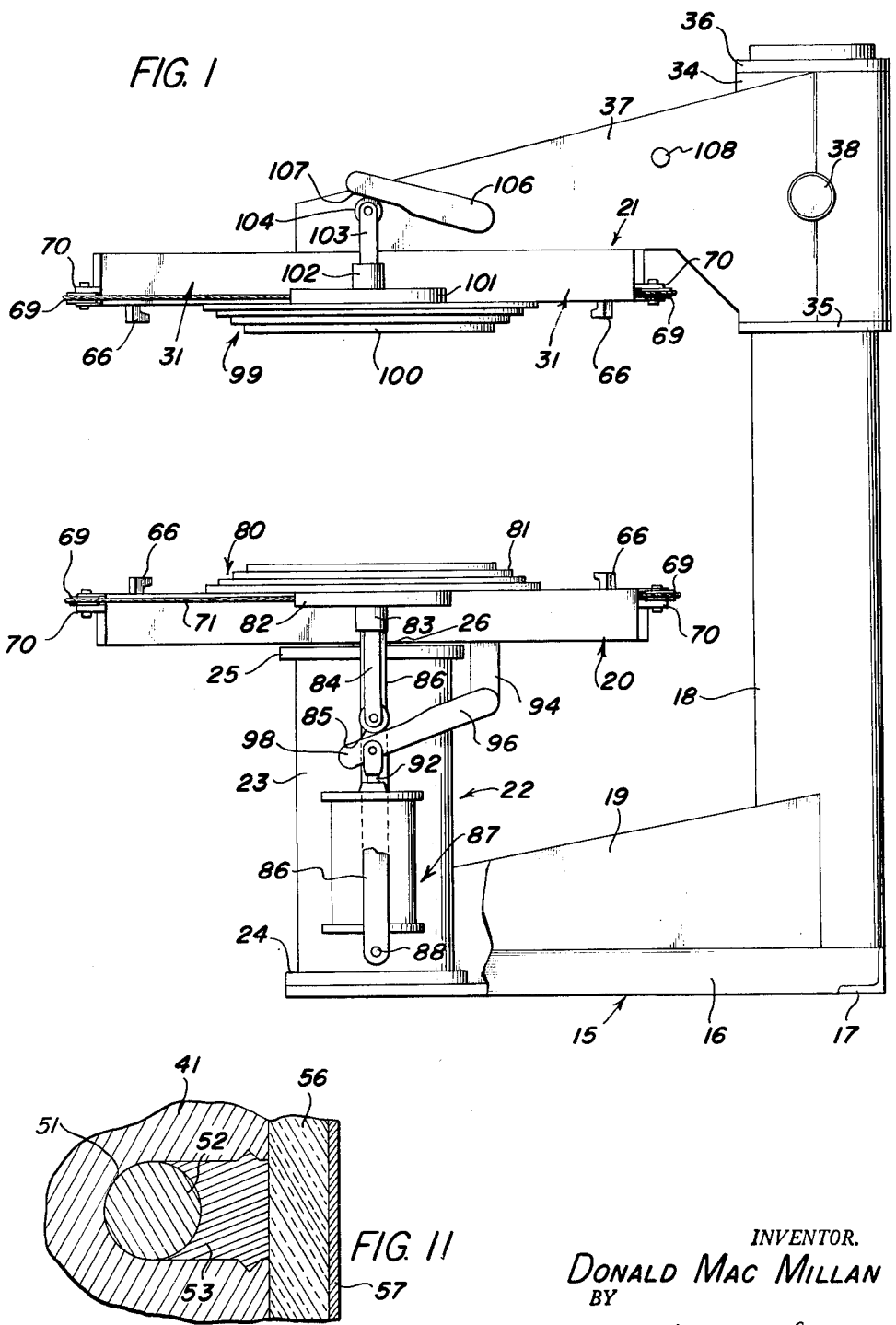
FIGURE 1 is a side elevational view of the loader in an open position ready for the reception of a matrix therein, a lower portion of the loader being broken away for purposes of clarity.

In the embodiment of the invention illustrated in the drawings, the loader is generally referred to by the numeral 15. The loader 15 includes a base which is formed of an upwardly opening channel member 16 having a pair of outrigger legs 17 extending normal thereto at the rear end thereof. A column 18 is seated within the rear portion of the channel member 16 and is braced relative thereto by plate type braces 19, as is best illustrated in FIGURE 1.

The loader 15 also includes a vertically movable lower matrix half support, generally referred to by the numeral 20, and an upper matrix half support, generally referred to by the numeral 21, the support 21 being vertically stationary. The lower matrix half support 20 is carried by a vertically disposed extensible fluid motor, generally referred to by the numeral 22. The fluid motor 22 includes an upstanding cylinder 23 having a base plate 24 seated within the channel member 16. The cylinder 23 also includes an upper head 25 against which the support 20 bears when the support 20 is in its lowermost position. The support 20 is carried by a piston rod 26 which projects upwardly through the head 25.

The lower matrix half support is formed of a plurality of radiating support arm assemblies, generally referred to by the numeral 27. Each support arm assembly 27 is formed of a pair of upstanding bars 28 which intersect and are secured to other bars at their inner ends. The outer ends of the bars 28 are secured together in spaced relation by means of an end member 29. The upper surfaces of all of the bars 28 lie in a common plane for engaging and supporting a lower matrix half.

It is to be noted that two of the bars 28 are co-extensive and others of the bars 28 are secured thereto. A sleeve 30 is positioned intermediate the two bars 28 at the centers thereof. The upper end of the piston rod 26 is received in the sleeve and is secured thereto. In this manner, the lower matrix half support 20 is secured to the piston rod 26 for movement therewith.

The upper matrix half support is of a similar construction to the lower matrix half support. The upper matrix half support 21 is formed of a plurality of support arm assemblies 31 which are disposed in radiating relation. Each support arm assembly 31 is formed of a pair of parallel bars 32, the inner ends of the bars 32 being secured together, and the outer ends of the bars 32 being connected together by end members 33.

The upper matrix half support 21 is supported from the column 18. This is accomplished through a sleeve 34 which is rotatably journaled on the upper portion of the column 18. The sleeve 34 is restrained against vertical movement by a lower collar 35 and an upper collar 36 disposed on the upper portion of the column 18 and engaging the lower and upper ends, respectively, of the sleeve 34. A pair of elongated support arms 37 are secured to the sleeve 34 and extend outwardly therefrom in parallel relation. The support arms are of an offset construction, as is best illustrated in FIGURE 1, and have suitably secured to the undersides thereof the upper edges of the bars 32. The lower edges of the bars 32 lie in a common plane for engaging a matrix half.

Figure 3:
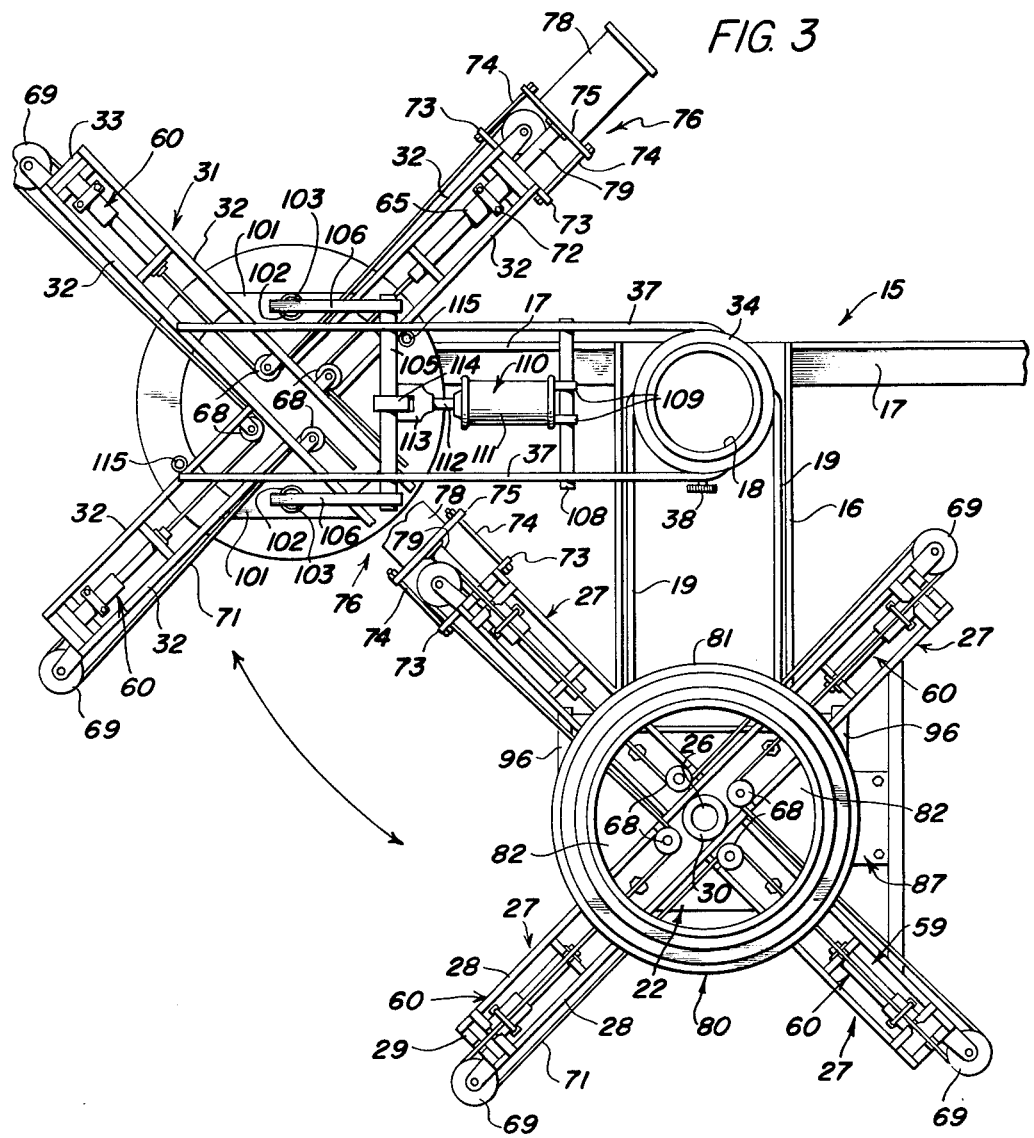
FIGURE 3 is a plan view of the loader with the upper matrix half support being swung to an out-of-the-way position.
Figure 10:
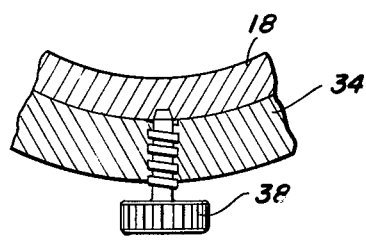
FIGURE 10 is an enlarged fragmentary sectional view, taken through the upper part of the column for the upper matrix half support, and shows the details of the locking screw for retaining the upper matrix half support against rotation.

Although the upper matrix half support 21 is fixed against vertical movement, it is pivotally mounted on the column 18 through the mounting of the sleeve 34. In order to retain the upper matrix half support 21 in alignment with the lower matrix half support 20 when it is so desired, the sleeve 34 is provided with a locking screw 38 which passes into the column 18 in the manner best illustrated in FIGURE 10. When it is desired to swing the upper matrix half support out of alignment with the lower matrix half support, as is best illustrated in FIGURE 3, it is necessary to first release the screw 38, after which the sleeve 34 is free to rotate on the column 18.

The loader 15 contains other structural features which will be described in detail hereinafter. However, in order to understand the purpose and function of these additional structural features, it is first desirable to understand the construction of the matrix which is associated with the loader.

The matrix is generally referred to by the numeral 39, and includes a pair of matrix halves 40 and 41. Each of the matrix halves 40 and 41 is generally L-shaped in cross-section, and the two matrix halves combine to form a channel-cross-section matrix. The internal configurations of the matrix halves 40 and 41 are such to receive a tire casing or carcass 42 having a camelback or new tread material 43 positioned thereon. Also, the internal configuration of the matrix halves 40 and 41 include tread forming portions 44.

In order to facilitate alignment of the matrix halves 40 and 41, the mold halves 40 and 41 have opposing faces 45 and 46, respectively. The faces 45 and 46 are offset with the offsets being complementary so that the faces 45 and 46 interlock with each other and so align the matrix halves 40 and 41.

The matrix halves 40 and 41 are provided with opposed peripheral annular ribs 47. The annular ribs 47 are provided with tapered remote surfaces 48. A channel-shaped clamping band 49 receives the annular ribs 47 and engages the tapered surfaces 48 to urge the matrix halves 40 and 41 together. Thus, the clamp band 49 retains the matrix halves into closely interfitting, interlocked relation.

The matrix halves 40 and 41 are provided with additional annular peripheral ribs 50 adjacent the outer surfaces thereof. The purpose of the ribs 50 is for the clamping of the matrix halves to their respective matrix half supports in a manner to be described in detail hereinafter.

As is best illustrated in FIGURE 11, each of the matrix halves 40 and 41 is provided with an annular recess 51 in the outer surface thereof. The annular recess 51 is relatively deep and has seated therein a heating element 52. The heating element 52 is retained in its respective recess 51 by a locking ring 53 which is formed of metal cast into the outer portion of the recess 51. It is to be noted that the cross-section of the recess 51 in the area of the locking ring 53 is such that the locking ring 53 is firmly locked within the respective matrix half.

Each of the matrix halves includes an electric receptacle in the form of a plug outlet 54 to facilitate the plugging in of a power line. Also, each of the matrix halves includes a thermostatic control element 55 which is disposed in the electrical circuit intermediate the outlet 54 and the heating element 52.

In order to retain the heat generated by the heating elements 52 within the matrix halves 40 and 41, and also to prevent the burning of employees handling the matrix 39, the matrix halves 40 and 41 are provided with suitable insulation 56. The insulation 56 is preferably covered and retained in place by covering material 57.

In the use of the matrix 39, a curing tube 58 is inserted within the tire casing 42 and is inflated in order to hold the camelback tightly against the interior surface of the matrix halves. The curing tube will be of the customary type and may be inflated in any desired manner.

Each of the matrix half supports 20 and 21 is provided with a matrix half clamp assembly, generally referred to by the numeral 59. Since the clamp assemblies 59 are identical, only the details of one of the clamp assemblies will be set forth hereinafter.

Figure 8:
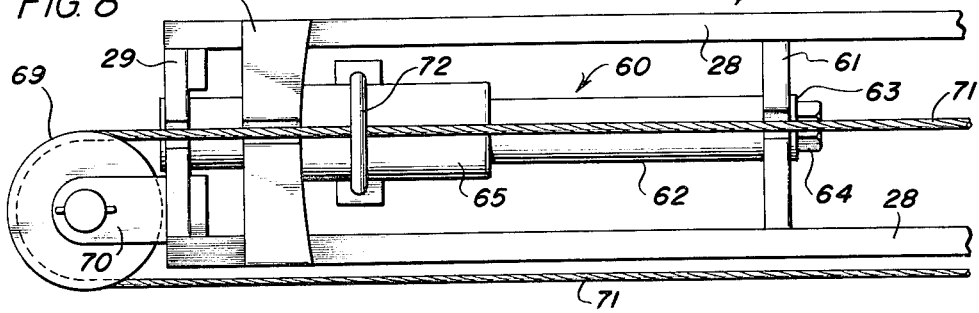
FIGURE 8 is an enlarged fragmentary plan view of one of the arms of a matrix half support, and shows the specific details of the mounting of one of the matrix half clamps.

The clamp assembly 59 includes a plurality of individual clamp units, generally referred to by the numeral 60, each clamp unit 60 being carried by a respective one of the support arm assemblies 27 and 31. The details of a typical clamp unit 60 are best illustrated in FIGURE 8.

Each of the support arm assemblies includes an extra plate 61 extending between the bars thereof in spaced relation to the end members. For example, assuming the support arm assembly illustrated in FIGURES 8 and 9 to be the support arm assembly 27, the plate 61 is disposed intermediate the bars 28 remote from the end member 29. A guide rod 62 extends between the plate 61 and the end member 29. The guide rod 62 is retained in place by a washer 63 and a nut 64 disposed on one end thereof, and bearing against the plate 61. A sleeve 65 is disposed on the guide rod 62 for sliding movement between the end member 29 and the plate 61. A generally inverted L-shaped clamp member 66 is connected to the sleeve 65 in upstanding relation, the clamp member 66 including a lip portion 67 which is inwardly directed, as is best illustrated in FIGURE 9.

The central portions of the support arm assemblies 27 and 31 are provided with pulleys 68. The pulleys 68 are disposed in off-center relation and are suitably carried by respective ones of the bars 28 and 32. Other pulleys 69 are supported by brackets 70 projecting outwardly from the end members 29 and 33. An endless cable 71 is entrained over the pulleys 68 and 69. The endless cable 71 extends directly above the sleeve 65 of each clamp unit 60 and is secured to the sleeve 65 by a clamp 72. The clamp 72 is preferably in the form of a U-bolt and strap assembly, as is best illustrated in FIGURES 8 and 9. It is to be noted that the end members 29 and 33, the plates 61 and the clamp members 66 are provided with recesses for the passage of the endless cable 71.

Figure 7:
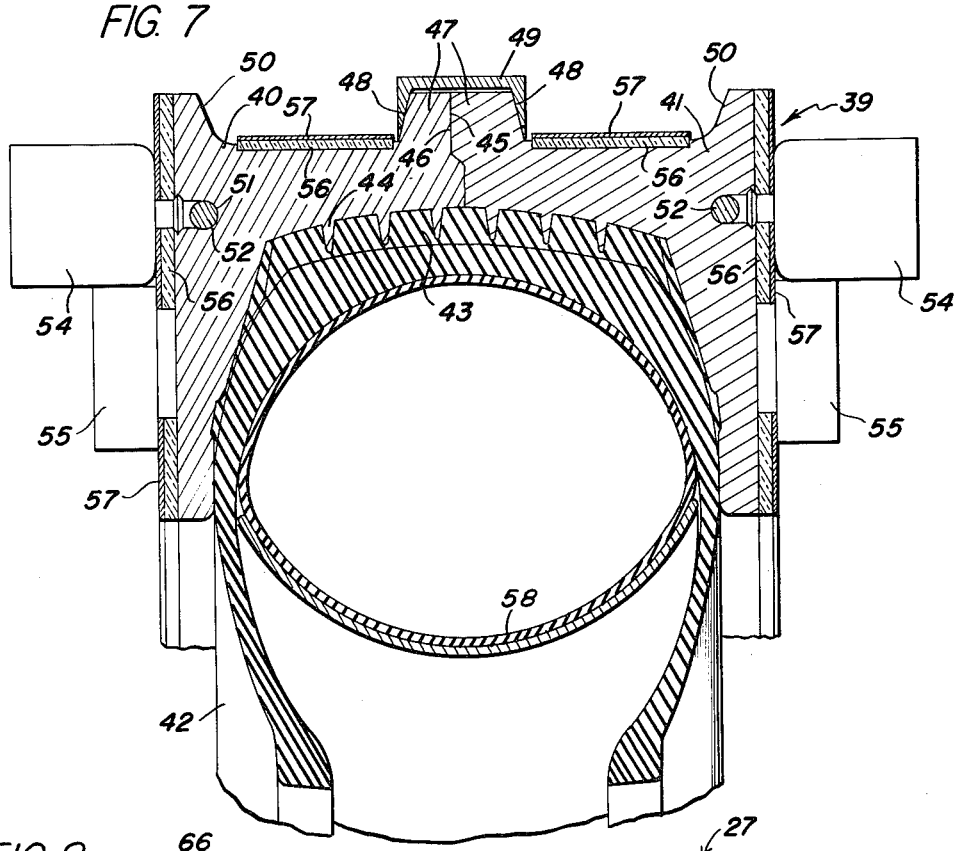
FIGURE 7 is an enlarged fragmentary vertical sectional view taken through the matrix, and shows the specific construction of the matrix, including the relationship of the matrix halves with respect to each other and to the tire being cured.
Figure 9:
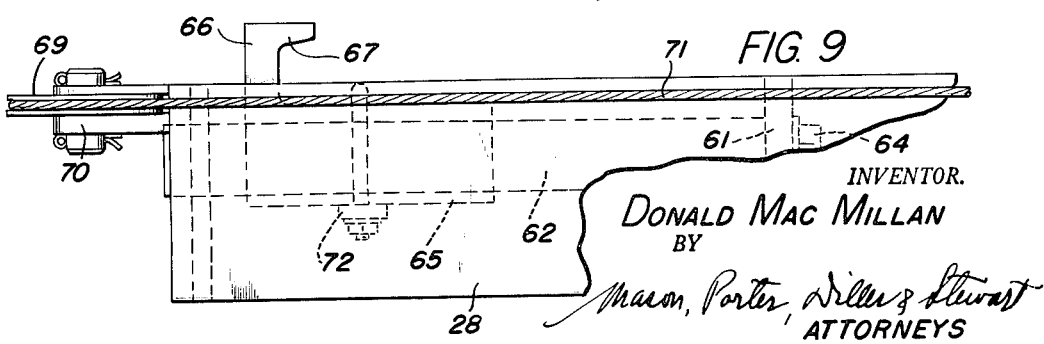
FIGURE 9 is an enlarged fragmentary elevational view of the support arm and the matrix half clamp.

Comparing the details of the lip portion 67, as is illustrated in FIGURE 9, with the annular ribs 50 of the matrix halves, as is best illustrated in FIGURE 7, it will be seen that the two have complementary surfaces, and that the proportions thereof are such that the clamp member 66 will have its lip portion 67 engaged over the annular rib 50 of a respective one of the matrix halves 40 and 41. Thus, when the matrix halves 40 and 41 are bearing against the respective ones of the matrix half supports 20 and 21, the clamp members 66, when moved towards the center of the matrix half supports, will engage the annular ribs 50 and clamp the matrix halves against their respective matrix half supports.

Referring now to FIGURE 3 in particular, it will be seen that the bars of one of each of the support arm assemblies 27 and 31 are provided at the outer ends thereof with mounting flanges 73. The mounting flanges 73 carry spacer bolts 74 which pass through a mounting flange 75 of an extensible fluid motor, generally referred to by the numeral 76. The extensible fluid motor 76 includes a cylinder 78 and a piston rod 79. It is to be noted that the piston rod 79 is integrally connected to the guide rod of the particular clamp unit 60, and that the guide rod, together with the piston rod 79, is free to slide through the respective end member 29 or 33 and the respective plate 61. Further, the sleeve 65 is rigidly secured to the particular guide rod 62. Thus, by actuating the fluid motor 76, the piston rod 79 thereof will move the associated guide rod 62, the associated sleeve 65, and the associated clamp member 66 to move the endless cable 71. Thus, by shifting one clamp member 66 of a set, all of the clamp members of that set are shifted a like distance. In this manner, the clamp members 66 also serve to center the matrix halves on their resective supports.

The lower matrix half support 20 is provided with a lower bead aligner, generally referred to by the numeral 80. The lower bead aligner includes a stepped annulus 81 which corresponds to the beads of various diameters of tires. The stepped annulus 81 normally rests upon the bars 28.

A pair of triangular gusset plates 82 are disposed within the angles defined by the support arm assemblies 27 on opposite sides of the center line of the channel member 16. Each of the plates 82 carries a guide sleeve 83 through which a vertically extending rod 84 extends. The upper ends of the rods 84 pass through the plates 82 and are secured to the underside of the annulus 81. The lower end of each of the guide rods 84 is provided with a roller type follower 85.

A pair of hangers 86 hang downwardly from the support arm assemblies 27 at one side of the channel member 16. The hangers support an extensible fluid motor, generally referred to by the numeral 87, by means of a cross-bar 88 at the lower ends of the hangers 86. The cross-bar 88 is connected to a base 89 of the fluid motor by straps 90 so as to permit pivotal movement of the fluid motor 87.

The fluid motor 87 also includes a cylinder 91 and a piston rod 92. The piston rod 92 is connected to a bifurcated fitting 93.

Other hangers 94 depend down from the support bar assemblies on one side of the channel member 16. A rod 95 extends through the hangers 94 and is rotatably journaled therein. The rod 84 is provided with a pair of arms 96 at the opposite ends thereof. One of the arms 96 is positioned within the fitting 92 and is pivotally connected thereto by a pin 97. It is to be noted that the upper surface of each of the arms 96 includes a cam surface 98.

Each of the arms 96 underlies a respective one of the rods 84 and the cam surface 98 of each arm 96 is engaged by its respective follower 85. Thus, when the fluid motor 87 is actuated to extend the piston rod 92 upwardly, the arms 96 are swung upwardly with the result that the rods 84 move upwardly to urge the stepped annulus 81 of the bead aligner 80 upwardly.

The upper matrix half support 21 is also provided with a bead aligner, the bead aligner being considered an upper bead aligner, generally referred to by the numeral 99. Like the bead aligner 80, the upper bead aligner 99 includes a stepped annulus 100. The stepped annulus 100 is identical with the annulus 81, and is in an inverted opposed relation. It is the intention of the invention that the two stepped annuluses cooperate by engaging the beads of a tire to center the tire with respect to the matrix half supports 20 and 21.

A pair of triangular gusset plates 101 are disposed within the angle defined by the support arm assemblies 31, the gusset plates 101 being disposed on opposite sides of the center line of the supports arms 37. Each of the gusset plates 101 supports a guide sleeve 102 through which a rod 103 extends. The rod 103 also extends through its respective gusset plate 101 and is connected to the upper surface of the annulus 100. The upper end of each rod 103 is provided with a roller type follower 104.

Figure 2:
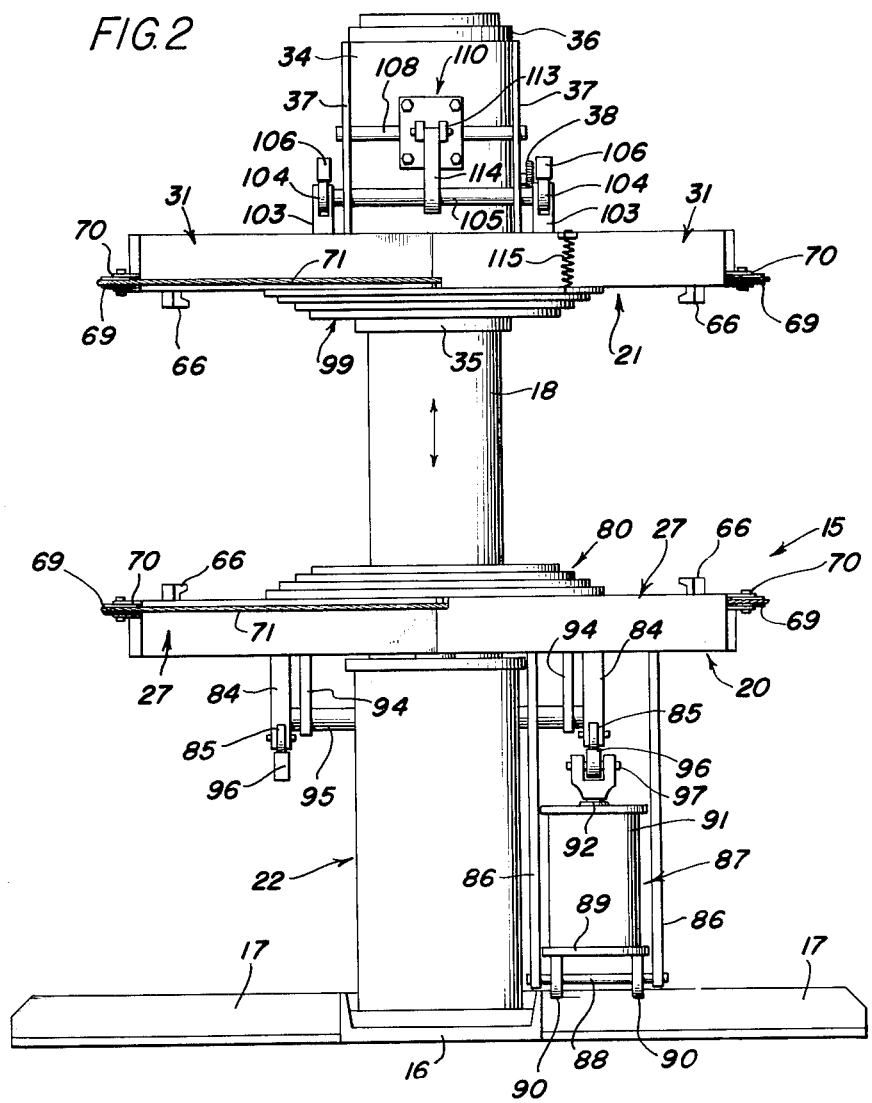
FIGURE 2 is a front view of the loader of FIGURE 1, and shows further the details thereof.

As is best illustrated in FIGURES 2 and 3, a rod 105 extends through and is rotatably journaled within the support arms 37. A pair of arms 106 are secured to the outer ends of the rod 105 outwardly of the arms 37. Each of the arms 106 is provided with a lower cam surface which bears against its respective follower 104, as is best illustrated in FIGURE 1.

A rod 108 extends between the arms 37 adjacent the sleeve 34. Ears 109 are mounted on the rod 108 and serve to support a fluid motor, generally referred to by the numeral 110. The fluid motor 110 is of the extensible type, and includes a cylinder 111 and a piston rod 112. The piston rod 112 is provided with a bifurcated fitting 113 which is connected to an upstanding arm 114 on the rod 105. Thus, when the fluid motor 110 is actuated to extend the piston rod 112, the rod 105 is pivoted to urge the arms 106 downwardly, the pivoting of the arms 106 being in a counterclockwise direction, as viewed in FIGURE 1, and forcing the rods 103 downwardly to force the annulus 100 downwardly. The annulus 100 is normally retained against the undersides of the support bars 32 by springs 115.

In order to facilitate the handling and storage of the matrix 39, a cart, generally referred to by the numeral 116, is provided. The cart 116 includes a rectangular base 117 which is provided at the several corners thereof with caster wheels 118. End supports 119 extend upwardly from the opposite ends of the base 117. Each of the end supports 119 includes a triangular lower portion 120 and an upright upper portion 121. The upper portion 121 is provided with a U-shaped fitting 122.

The clamping band 49 is provided with a pair of oppositely directed trunnions 123. The trunnions 123 are received in the fittings 122 and support the matrix 39 while supported by the cart 116. The relationship of the trunnions 123 to the cart 116 is best illustrated in FIGURES 5 and 6. Incidentally, the general details of a tensioning type clamp 124 of the clamping band 49 are also illustrated in FIGURES 6 and 7.

*Operation*

In the use of the loader 15, the lower matrix half support 20 is moved to its lowermost position, as is illustrated in FIGURES 1 and 2. The matrix 39, while supported by the cart 116, is then moved to a position adjacent the loader 15 and is pivoted to a horizontal position. Because of the construction of the cart 116 and the fact that the matrix 39 is supported at a sufficient height to clear the annulus 31, the matrix 39 may be directly moved into overlying relation with respect to the lower matrix half support 20. When the center of the matrix corresponds with the center of the matrix half support 20, the matrix half support 20 is moved upwardly by the actuation of the fluid motor 22. This action lifts the matrix 39 up out of engagement with the cart 116. The fluid motor 22 is operated until the matrix 39 engages the underside of the upper matrix half support 21. The fluid motors 76 of the clamp assemblies are then actuated to move the clamp member 66 into engagement with the ribs 50 of the matrix halves. The action of the clamp members 66 is to securely clamp the matrix halves in centered positions to their respective supports.

After the matrix halves 40 and 41 have been clamped to the supports 20 and 21, respectively, the matrix locking or clamping band 49 is released, by releasing the clamp 124. The lower matrix half support 20 is then lowered, utilizing the fluid motor 22.

The locking screw 38 is now released to permit the sleeve 34 to rotate on the column 18. The upper half of the loader is now swung out of alignment with the lower half of the loader to permit full accessibility to the lower half of the matrix 39, as is best illustrated in FIGURE 3.

A tire, with the camelback attached thereto and the curing tube positioned therein, is now placed in the lower half 40 of the matrix. When the tire is placed in the lower half of the matrix, the lower bead aligner 80 is extended through the operation of the fluid motor 87. This will center the tire in the bottom half of the matrix.

The upper half of the loader is now swung back into alignment with the lower half, and the locking screw 38 is repositioned to maintain the upper matrix half support 21 in alignment with the lower matrix half support 20. The lower half of the matrix is now moved upwardly and the upper bead aligner 99 is moved downwardly to align the upper half of the tire with the upper matrix half 41. The support 21 is continued to be moved upwardly until the bottom matrix half 40 engages the upper matrix half 41 and the matrix is closed. The two halves 40, 41 of the matrix 39 are then locked together by positioning the locking band and swinging the clamp thereof to a locked position. The bead aligners 80 and 99 are now retracted to release the tire. Also, the clamp members 66 are retracted to release the matrix. The matrix 39 is then lowered by lowering the support 20. When the support 20 and the matrix 39 are lowered, the fittings 122 of the cart 116 are aligned with the trunnions 123 so as to receive the trunnions and to support the matrix when the support 20 moves to its lowermost position. The loaded matrix may now be moved away from the loader on the cart to a stored position. The necessary electrical connections are made with the matrix and the tire cured. Since the matrix 39 is an upright position, it will be apparent that a minimum amount of space is required for the curing operation. It is to be understood, of course, that the curing tube 58 will be inflated during the curing operation.

After the tire has been cured, it is removed from the matrix by repeating the initial steps of the aforementioned operation. The tire is ejected from the lower matrix half 40 by the operation of the lower bead aligner 80.

In order to assure the operation of the various components of the loader, it is desirable that the various fluid motors be of the double-acting type. If desired, a central control panel (not shown) may be provided for the ease of operating the loader.

Since only one loader is required for a plurality of matrices, and since the individual matrix requires only a minimum amount of space during curing, it will be readily apparent that a greater number of tires may be retreaded utilizing the same amount of work area as heretofore allotted to existing types of retreading machines, when the present machine is utilized. Further, a much greater use is being made of the heavy equipment of the press structure of the loader, since it is utilized a plurality of times in conjunction with a number of matrices as compared to the single use of the press structure of the present type of retreading machine.

From the foregoing, it will be seen that novel and advantageous provision has been made for carrying out the desired end. However, attention is directed to the fact that variations may be made in the example apparatus disclosed herein without departing from the spirit and scope of the invention, as defined in the appended claim.

I claim:

A loader for a replaceable vehicle tire retreading matrix comprising a supporting frame of the type having an extensible portion, a vertically stationary upper matrix half support secured to said frame, a movable lower matrix half support carried by said extensible portion, and clamp means carried by said matrix half supports for releasably clamping a matrix half to each of said matrix half supports, said upper and lower matrix half supports also supporting upper and lower bead aligners for engaging tire beads and thereby centering a tire, return spring means extending between said upper bead aligner and said upper matrix half support for moving said upper bead aligner to a retracted position while said lower bead aligner is gravity urged to a retracted position, a pair of arms carried by each matrix half support for swinging movement, means connected to each pair of arms for simultaneously swinging the arms of each pair of arms towards the respective one of said bead aligners, and diametrically oppositely positioned followers fixedly mounted on each bead aligner in opposed relation to and engaged with respective ones of said arms for moving said bead aligners towards each other to tire centering positions.

References Cited by the Examiner

UNITED STATES PATENTS

| | | | |
|---|---|---|---|
| 2,691,798 | 10/1954 | Winchester et al. | 18—19 |
| 2,759,220 | 8/1956 | Hawkinson | 18—18 |
| 2,778,063 | 1/1957 | Duerken | 18—18 X |
| 2,801,443 | 8/1957 | Duerken | 18—18 |
| 2,895,166 | 7/1959 | MacMillan | 18—18 |
| 2,903,742 | 9/1959 | Barefoot | 18—18 |
| 2,923,527 | 2/1960 | Fannen. | |
| 2,978,741 | 4/1961 | Soderquist | 18—2 |
| 2,987,770 | 6/1961 | Powell | 18—18 |
| 3,015,130 | 1/1962 | Voth | 18—18 |
| 3,015,845 | 1/1962 | Duerksen | 18—18 |
| 3,074,109 | 1/1963 | Duerksen | 18—18 |

FOREIGN PATENTS

| | | |
|---|---|---|
| 608,503 | 11/1960 | Canada. |
| 664,608 | 1/1952 | Great Britain. |

J. SPENCER OVERHOLSER, *Primary Examiner.*

MICHAEL V. BRINDISI, *Examiner.*